(12) United States Patent
Santry et al.

(10) Patent No.: US 7,979,416 B1
(45) Date of Patent: Jul. 12, 2011

(54) METADIRECTORY NAMESPACE AND METHOD FOR USE OF THE SAME

(75) Inventors: Douglas J. Santry, San Francisco, CA (US); Raymond C. Chen, Campbell, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 12/564,295

(22) Filed: Sep. 22, 2009

Related U.S. Application Data (63) Continuation of application No. 11/861,863, filed on Sep. 26, 2007, now Pat. No. 7,613,724, which is a continuation of application No. 10/191,705, filed on Jul. 9, 2002, now Pat. No. 7,386,546.

(51) Int. Cl.
G06F 17/00 (2006.01)
(52) U.S. Cl. ........ 707/706; 707/711; 707/716; 707/726; 707/741
(58) Field of Classification Search .................. 707/711, 707/726, 741, 781, 785, 791
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 6,065,037 A | 5/2000 | Hitz et al. | |
| 6,301,621 B1 | 10/2001 | Haverstock et al. | |
| 6,425,035 B2 | 7/2002 | Hoese et al. | |
| 6,466,918 B1 | 10/2002 | Spiegel et al. | |
| 6,640,241 B1 | 10/2003 | Ozzie et al. | |
| 6,694,352 B1 | 2/2004 | Omogui | |
| 6,697,845 B1 | 2/2004 | Andrews | |
| 6,697,846 B1 | 2/2004 | Soltis | |
| 6,772,332 B1 | 8/2004 | Boebert et al. | |
| 7,043,485 B2 | 5/2006 | Manley et al. | |
| 7,194,519 B1 * | 3/2007 | Muhlestein et al. | 709/215 |
| 7,213,068 B1 * | 5/2007 | Kohli et al. | 709/225 |
| 7,249,150 B1 | 7/2007 | Watanabe et al. | |
| 7,386,546 B1 | 6/2008 | Santry et al. | |
| 2003/0145003 A1 | 7/2003 | Yellepeddy et al. | |
| 2004/0031015 A1 | 2/2004 | Ben-Romdhane et al. | |

OTHER PUBLICATIONS

U.S. Appl. No. 11/861,863, filed Sep. 26, 2007, Santry et al.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

(Continued)

*Primary Examiner* — Sana Al-Hashemi
(74) *Attorney, Agent, or Firm* — Cesari and McKenna, LLP (57) ABSTRACT

A data storage system is disclosed. A flag is maintained in metadata pointing to a block of data. A first value of the flag indicates that the block of data is stored in a user accessible file. A second value of the flag indicates that the block of data is stored in a protected file. The flag pointing to the requested data block is checked upon receipt of a data access request. When the flag has the first value the data access request is permitted. When the flag has the second value, an access control list is checked, and if the requesting client is listed in the access control list permitting the data access request, and if the requesting client is not listed in the access control list denying the data access request.

49 Claims, 8 Drawing Sheets

OTHER PUBLICATIONS

NFS Backgrounder, Article is Chapter 9 'The Network Filesytem' reprinted from "The Design and Implementation of the 4.4BSD Operating System" by Marshall Krik McKusick et al. 1996.

Hitz, Dave et al., File System Design for an NFS File Server Appliance, Technical Report 3002, Rev. C395, presented Jan. 19, 1994, 23 pages.

Watson, Andy et al., Multiprotocol Data Access: NFS, CIFS and HTTP, Technical Report 3014, published Dec. 1996, 51 pages, retrieved from http://synergy-ds.com/netapp/wp_3014.pdf.

File System Design for an NFS File Server Appliance, TR3002 by Dave Hitz et al.

\* cited by examiner

METADIRECTORY NAMESPACE AND METHOD FOR USE OF THE SAME

RELATED APPLICATIONS

This application is a continuation of U.S. Ser. No. 11/861,863, filed by Douglas J. Santry et al. on Sep. 26, 2007, now issued as U.S. Pat. No. 7,613,724 on Nov. 3, 2009, which is a continuation of U.S. Ser. No. 10/191,705, filed by Douglas J. Santry et al. Jul. 9, 2002, now issued as U.S. Pat. No. 7,386,546 on Jun. 10, 2008.

FIELD OF THE INVENTION

The present invention relates to file systems and, more specifically, to organizing files and directories within a file system.

BACKGROUND INFORMATION

A network storage appliance is a special-purpose computer that provides file service relating to the organization of information on storage devices, such as disks. The network storage appliance or filer typically accesses one or more storage volumes. A storage volume comprises physical storage devices defining an overall logical arrangement of storage space, and each volume is usually associated with its own file system. Currently available filer implementations can serve a large number of discrete volumes (150 or more, for example).

Additionally, a filer may be made more reliable and stable in the event of a system shutdown or other unforeseen problem by employing a backup memory consisting of a non-volatile random access memory (NVRAM) as part of its architecture. An NVRAM is typically a large-volume solid-state memory array (RAM) having either a back-up battery, or other built-in last-state-retention capabilities (e.g. a FLASH memory), that holds the last state of the memory in the event of any power loss to the array.

A filer includes a storage operating system that implements a file system to logically organize stored information as a hierarchical structure of directories and files. As used herein, the term "storage operating system" generally refers to the computer-executable code operable on a computer that manages data access and may, in the case of a filer, implement file system semantics. The storage operating system can also be implemented as an application program operating over a general-purpose operating system, such as UNIX® or Windows NT®, or as a general-purpose operating system with configurable functionality, which is configured for storage applications as described herein. The set of valid file names and directory names recognized by a file system comprises its namespace. Each "on-disk" file may be implemented as a set of disk blocks configured to store information, such as text, whereas the directories may be implemented as specially formatted files in which information about other files and directories are stored.

In general, a filer may be configured to operate according to a client/server model of information delivery to thereby allow many clients to access files and directories stored on a server, e.g., the filer. In this model, the client may communicate with the filer over a computer network, such as a point-to-point link or a shared local area network, using a known protocol such as the conventional Common Internet File System (CIFS) protocol for the Microsoft® Windows™ operating system or the Network File System (NFS) protocol for UNIX-based operating systems.

More specifically, a client can locate a desired file or directory within a namespace exported by a filer. Using a recognized file system protocol, the client can send the filer an access request, such as READ, WRITE, RENAME or REMOVE, along with a unique file handle identifier for the desired file or directory. The filer uses the file handle to locate the requested file or directory within a file system and typically returns information appropriate for the client access request or returns an error code explaining why the request could not be completed. A file access request to the filer may also originate from a local user or application instead of from a remote client. In this case, the local user or application can navigate the file system namespace and submit a file access request along with a file handle identifier for a desired file or directory.

Because a filer can handle file access requests from a large number of sources, ranging from remote clients to local users and applications, access to files and directories within the filer is often restricted to prevent an unauthorized client, user or application from accessing protected information. An example of restricted files and directories within a filer may include, but are not limited to, configuration files, system files, support files and temporary files not intended to be globally accessible. A protected file or a restricted file used herein refers to any file or directory having restricted file access.

Figure 1:
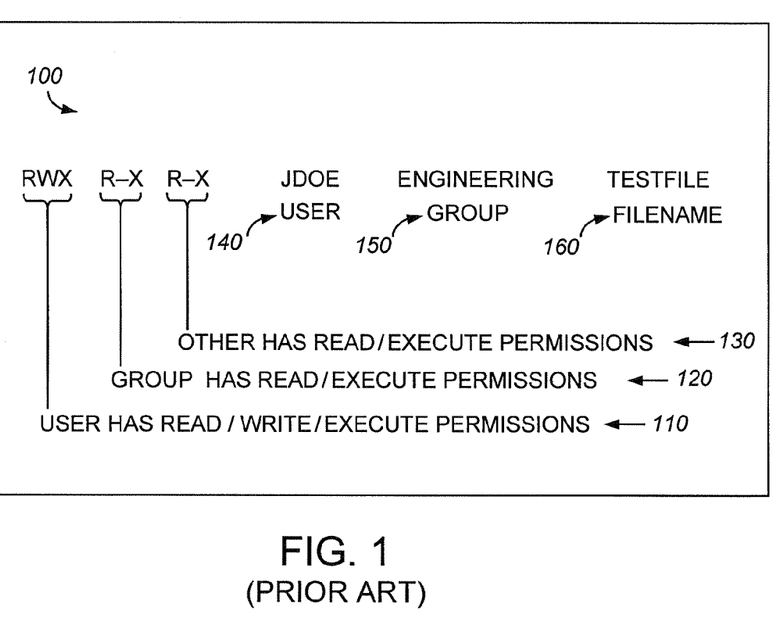
FIG. 1, already described, is an example of access modes assigned to a Unix file.
Figure 2:
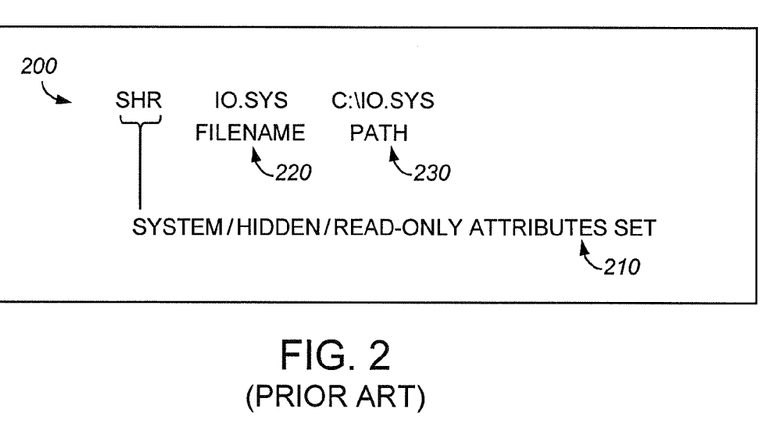
FIG. 2, already described, is an example of file attributes assigned to a MS-DOS™ file.
Figure 3:
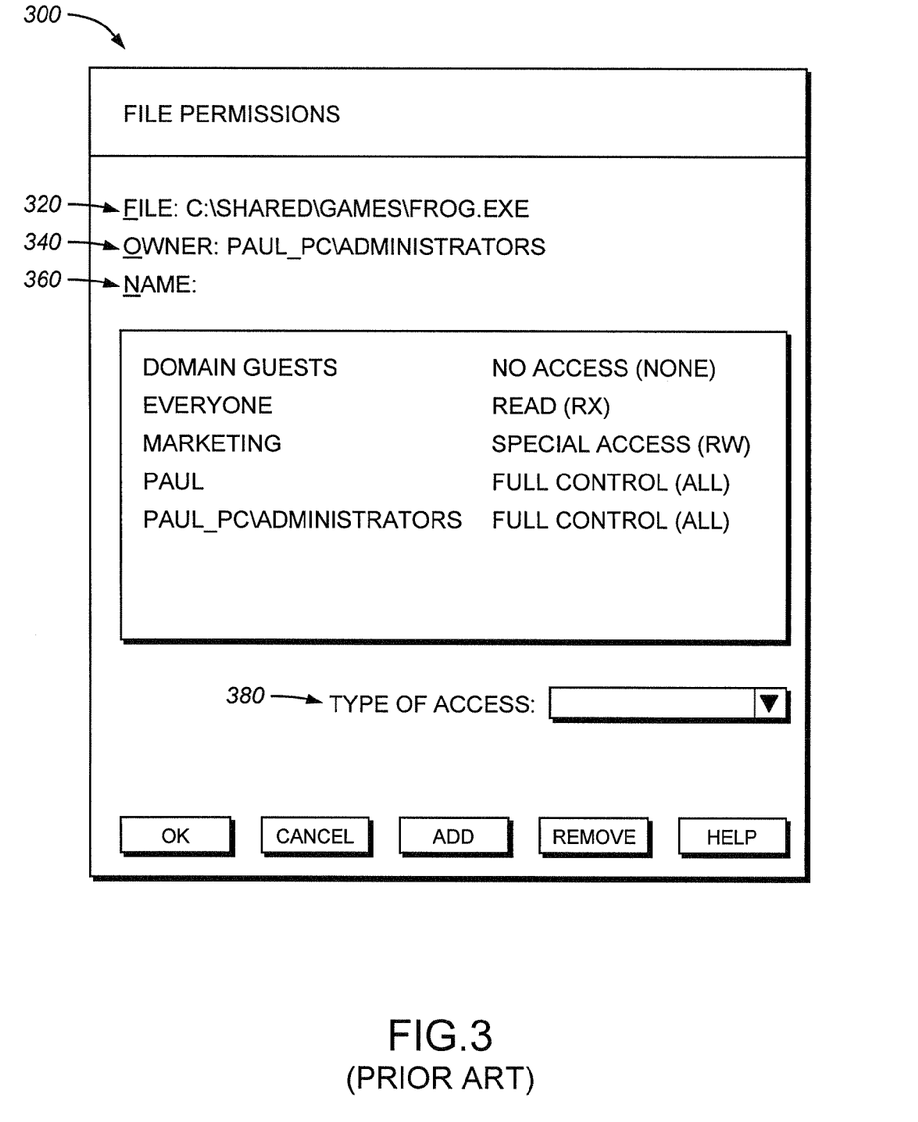
FIG. 3, already described, is an example of an access control list assigned to a NT™-file.

A number of conventional methods are used for restricting access to files and directories in a file system. In Unix-based operating systems, file access is typically restricted by associating an access mode with each file and directory. The access mode grants a selected combination of read/write/execute (rwx) permissions to different categories of users. FIG. 1 illustrates an exemplary file permission 100 for a Unix file named "testfile" that includes, inter alia, sets of access mode flags 110, 120 and 130, a user identifier 140, a group identifier 150 and a file name 160. Access to the file is restricted by access mode flags 110, 120 and 130 that respectively define the rwx file permissions for a user, "jdoe," a group of users, "engineering," and all other users, "other." In Microsoft® DOS-based operating systems, file access is restricted according to file attributes associated with each file and directory. For example, FIG. 2 illustrates file attributes 200 for file 220, "IO.SYS," located on a disk labeled "CA" as described by path 230. As shown, IO.SYS has file attributes 210 indicating it is a read-only file, "R," for use by the operating system, "S," and hidden from a user-accessible namespace, "H." In the Microsoft® Windows NT™ operating system, an access control list associated with each file and directory grants access permissions to different categories of users. As shown in FIG. 3, an access control list 300 is associated with the file "Frog.exe." The location of the file 320 and the owner of the file 340 are listed in a header portion of the access control list, whereas access permissions 360 are explicitly described separately for individual users, e.g. "Paul," and groups of users, e.g. "Marketing." Typically, access control lists additionally include a field 380 for setting file and directory permissions.

Despite utilizing the conventional file security techniques described above, files with special access restrictions are often "visible" in the user-accessible namespace of a file system. For instance, although access to system files may be restricted to specific modules within a filer's storage operating system, those files may still be seen by any user or application that can navigate the file system's namespace. Therefore, there is a need to effectively "hide" restricted files and directories in a file system namespace to assure they cannot be improperly tampered with by unauthorized clients, users and applications.

Past techniques for hiding file names in a file system namespace have included assigning a hidden attribute to restricted files and directories indicating they should not automatically be displayed in a user-accessible namespace. For example, file systems implemented by Microsoft® DOS™-based operating systems assign attributes to files and directories to indicate whether the file is e.g., read-only, hidden, archived, system, or compressed. Unix-based operating systems do not use hidden attributes, but instead automatically hide file names and directories beginning with a "dot." Although previous methods have hidden the names of protected files and directories in a file system namespace, most storage operating systems have allowed users to view hidden files and directories by setting appropriate flags in their file access request. For instance, the DOS command "dir *.*" and the Unix command "ls -a" effectively allow a user to list both hidden and non-hidden files. Therefore, past techniques for hiding protected files and directories suffer the disadvantage of allowing users to easily locate hidden files in a user-accessible namespace.

Yet other approaches to hiding files and directories in a file system have been employed. For example, the Data ONTAP™ storage operating system, available from Network Appliance, Inc. of Sunnyvale, Calif., may implement a Write Anywhere File Layout (WAFL™) file system such that hidden files and directories in a WAFL volume are not directly located in the user-accessible namespace.

Broadly stated, the on-disk format representation of the WAFL file system is block-based using, e.g., 4 kilobyte (KB) blocks and using inodes to describe the files. An inode is a data structure used to store information, such as metadata, about a file. That is, the information contained in an inode may include, e.g., ownership of the file, access permission for the file, size of the file, file type and location of the data for the file on disk. The WAFL file system uses a file handle, i.e., an identifier that includes an inode number, to retrieve an inode from disk. The WAFL file system also uses files to store metadata describing the layout of its file system. These metadata files include, among others, an inode file that describes files and directories stored in the file system. The on-disk format structure of the WAFL file system, including the inodes and inode file, is disclosed and described in commonly assigned U.S. Pat. No. 5,819,292 entitled Method for Maintaining Consistent States of a File System and for Creating User-Accessible Read-Only Copies of a File System by David Hitz et al., issued on Oct. 6, 1998 and expressly incorporated herein by reference.

The WAFL file system can "hide" protected files and directories by pre-allocating their inode numbers outside the user-accessible namespace. In this way, clients, users and applications navigating the file system cannot directly locate inodes of these files. For instance, a protected file having a pre-allocated inode outside the user-accessible namespace may contain configuration data that should only be accessed by a specific application. Since only the storage operating system and the specific application know which inode number was assigned to the file, unauthorized clients, users and applications cannot create a valid file handle to submit file access requests for the protected file. Thus, unlike most conventional storage operating systems, access to hidden files is restricted to only those users having knowledge of the pre-allocated inode numbers of the protected files.

However, the method described above for hiding files in a file system may not scale well, and is inconvenient, when new files and directories need access protection. For instance, every time a new protected file is added to the file system, the storage operating system must be re-compiled to pre-allocate an inode number for the new file, then the pre-allocated inode number must be communicated to clients, users and applications permitted to access the protected file. Furthermore, there may be a limited number of reserved inodes available for pre-allocation.

Therefore, it is generally desirable to implement a file system capable of hiding protected files and directories outside its user-accessible namespace so the hidden files are accessible only to authorized clients, users and applications. Advantageously, the storage operating system should not require complicated function calls to access protected files and directories hidden in its file system and should scale easily when hidden files are added and removed.

SUMMARY OF THE INVENTION

The present invention overcomes the disadvantages of the prior art by comprising a parallel "metadirectory" namespace for hiding the names of protected files from one or more coexisting user-accessible namespaces. By constructing a separate hierarchical structure for protected files and directories, the metadirectory namespace may be selectively exported to only those clients, users and applications given special file access permissions. Furthermore, because protected files in the metadirectory namespace may be identified by name, the files do not need to be assigned pre-allocated inode numbers at compile time.

Although the metadirectory namespace of the present invention is envisioned to be useful within any storage operating system, illustrative embodiments are implemented within a filer. In one embodiment, each storage volume of a filer comprises at least one user-accessible namespace and at least one restricted-access metadirectory namespace. When a volume's file system is inode-based, the inodes in the volume (i.e., the inode file) may be organized so a metadirectory namespace and a user-accessible namespace have separate root directory inodes, directories, and files. Thus, clients, users and applications may make normal file access calls for files and directories stored in the user-accessible namespace, whereas authorized clients, users and applications may use a separate set of function calls to request files and directories stored in the metadirectory namespace.

In an illustrative embodiment, the metadata in an inode includes a flag bit indicating whether the inode belongs to the user-accessible namespace or the hidden metadirectory namespace. Therefore, if an unauthorized client, user or application requests access to an inode contained in the metadirectory namespace, the storage operating system can detect such an unauthorized access attempt by checking a flag bit in the requested inode.

These and other advantages of the present invention will become apparent in view of the following detailed description, drawings and claims.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A. Storage System Environment

Figure 4:
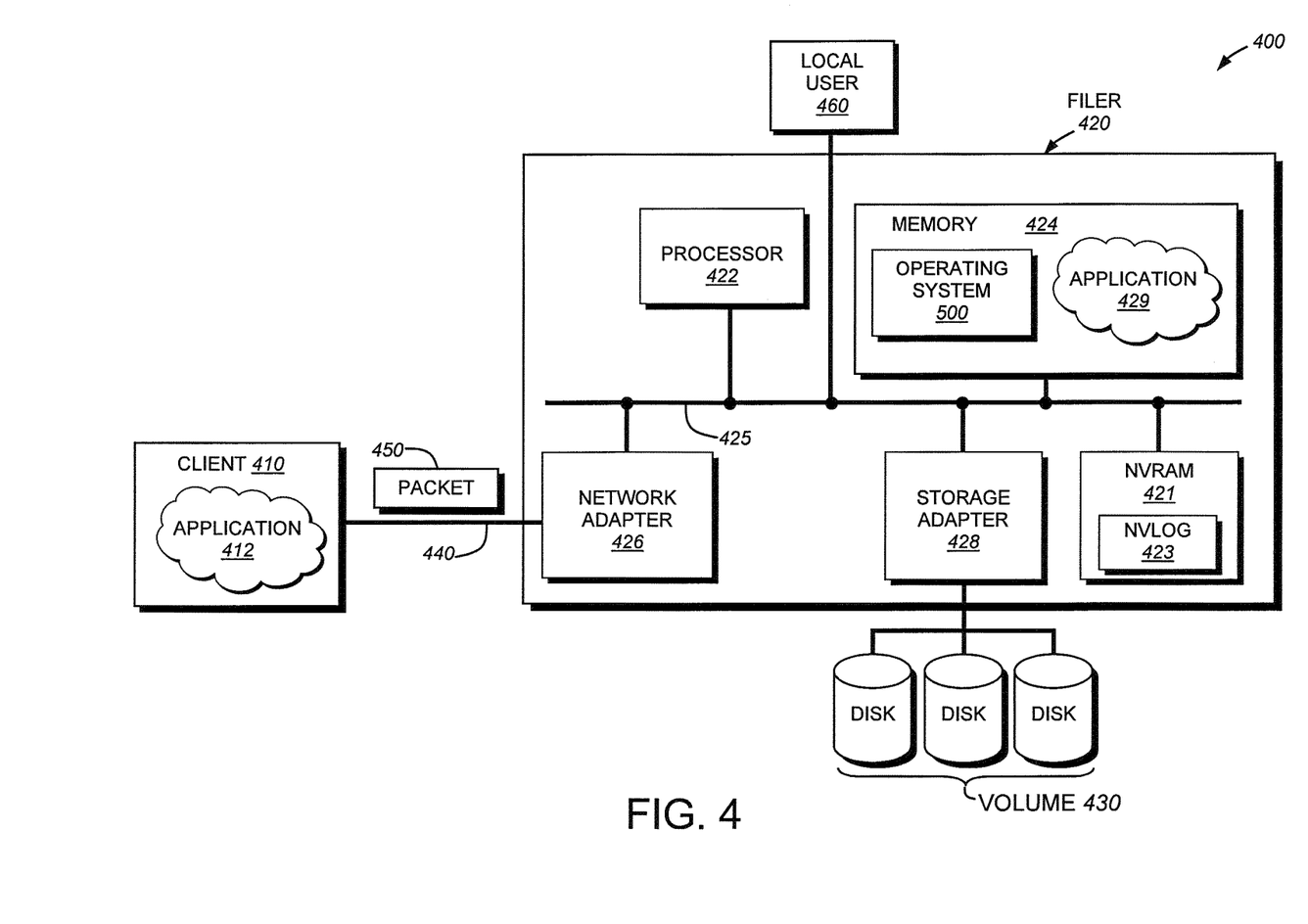
FIG. 4 is a schematic block diagram illustrating a storage system environment including a file server.

By way of further background, FIG. 4 is a schematic block diagram of a storage system environment 400 that includes a client 410 having one or more applications 412, and an interconnected file server 420 that may be advantageously used with the present invention. The file server or "filer" 420 is a computer that provides file service relating to the organization of information on storage devices, such as disks 430. It will be understood to those skilled in the art that the inventive technique described herein may apply to any type of special-purpose computer (e.g., server) or general-purpose computer, including a standalone computer. The filer 420 comprises an NVRAM 421, a processor 422, a memory 424, a network adapter 426 and a storage adapter 428 interconnected by a system bus 425. The filer 420 also includes a storage operating system 500 that implements a file system to logically organize the information as a hierarchical structure of directories and files on the disks. The filer 420 may also comprise one or more applications 429 running locally within memory 424.

In the illustrative embodiment, the memory 424 comprises storage locations for data and processor instructions that are addressable by the processor 422 and adapters 426 and 428. The processor and adapters may, in turn, comprise additional processing elements, memory and/or logic circuitry configured to execute software code and manipulate data structures. The operating system 500, portions of which are typically resident in memory and executed by the processing elements, functionally organizes the filer by, inter alia, invoking storage operations in support of a file service implemented by the filer. It will be apparent to those skilled in the art that other processing and memory means may be used for storing and executing program instructions pertaining to the inventive technique described herein. For example, memory 424 may comprise any combination of volatile and non-volatile computer readable media, and processor 422 may offload some processing to other specialized processors that may or may not be resident within filer 420.

The network adapter 426 comprises the mechanical, electrical and signaling circuitry needed to connect the filer 420 to a client 410 over a computer network 440, which may comprise a point-to-point connection or a shared medium, such as a local area network. The client 410 may be a general-purpose computer configured to execute applications 412, such as a database application. Moreover, the client 410 may interact with the filer 420 in accordance with a client/server model of information delivery. That is, the client may request the services of the filer, and the filer may return the results of the services requested by the client, by exchanging packets 450 encapsulating, e.g., the CIFS protocol or NFS protocol format over the network 440.

The storage adapter 428 cooperates with the operating system 500 executing on the filer to access information requested by the client. The information may be stored on disks 430 attached to the filer via the storage adapter. The storage adapter 428 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 422 (or the adapter 428 itself) prior to being forwarded over the system bus 425 to the network adapter 426, where the information is formatted into a packet and returned to the client 410.

Notably, the filer 420 includes an NVRAM 421 that provides fault-tolerant backup of data, enabling the integrity of filer transactions to survive a service interruption based upon a power failure, or other fault. The size of the NVRAM is variable. It is typically sized sufficiently to log a certain time-based chunk of transactions (for example, several seconds worth). An NVLOG 423 in the NVRAM 421 is filled after each client request is completed (for example, file service requests to LOAD, MODIFY, etc.), but before the result of the request is returned to the requesting client. The NVLOG contains a series of ordered entries corresponding to discrete client messages requesting file transactions such as "WRITE," "CREATE," "OPEN," and the like. These entries are logged in the particular order completed. In other words, each request is logged to the NVLOG at the time of completion—when the results of the requests are about to be returned to the client. The use of the NVLOG for system backup and crash recovery operations is generally described in commonly assigned application Ser. No. 09/898,894, entitled System and Method for Parallelized Replay of an NVRAM Log in a Storage Appliance by Steven S. Watanabe et al., now issued as U.S. Pat. No. 7,249,150 on Jul. 24, 2007, which is expressly incorporated herein by reference.

A local user 460 or administrator may also interact with the storage operating system 500 or with the one or more applications 429 executing on filer 420. The local user can input information to filer 420 using a command line interface (CLI) or graphical user interface (GUI) or other input means known in the art and appropriate I/O interface circuitry, e.g. a serial port. Thus, operating system 500 can receive file requests not only is from a remote client 410, but also from a local user 460 and local applications 429.

B. Storage Operating System

Figure 5:
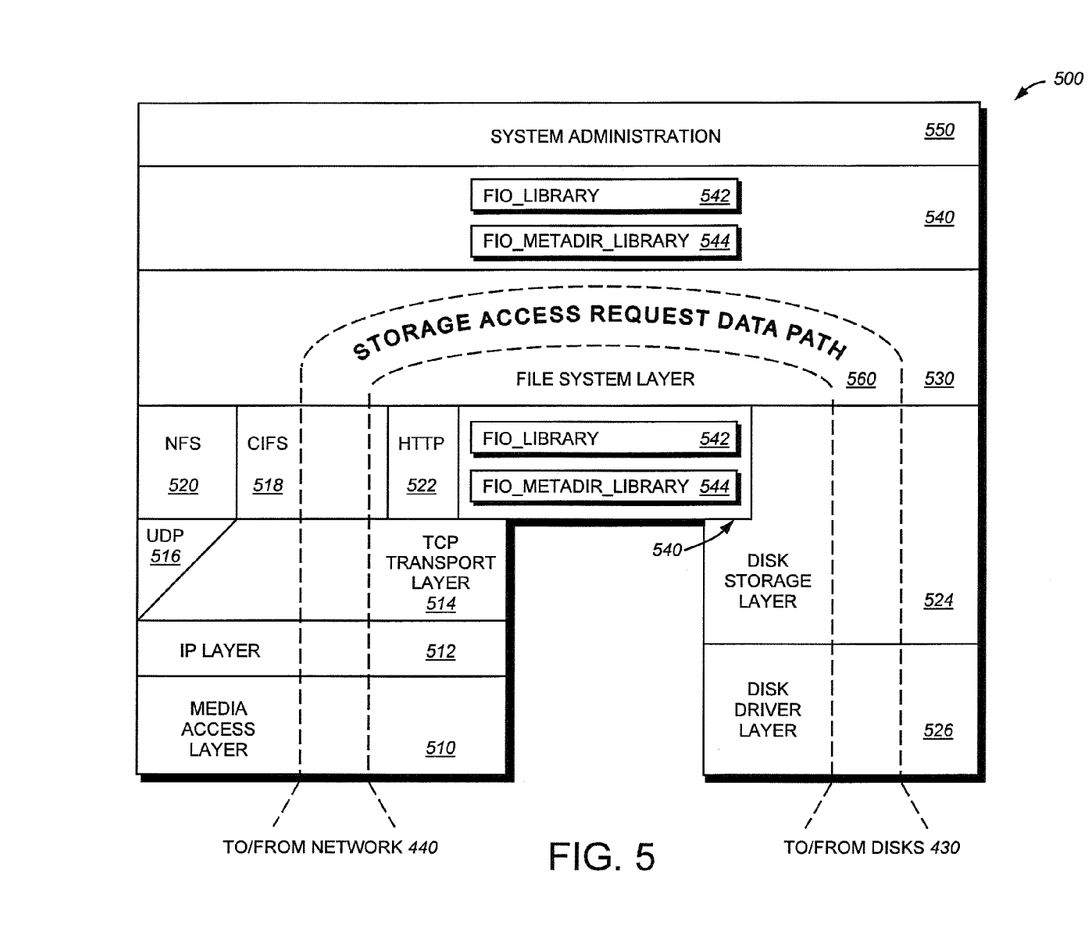
FIG. 5 is a schematic block diagram illustrating an exemplary storage operating system for use with the illustrative file server of FIG. 4.

FIG. 5 is a schematic block diagram of a storage operating system 500 that may be advantageously used with the present invention. The operating system comprises a series of software layers, including a media access layer 510 of network drivers (e.g., an Ethernet driver). The operating system further includes network protocol layers, such as the Internet Protocol (IP) layer 512 and its supporting transport mechanisms, the Transport Control Protocol (TCP) layer 514 and the User Datagram Protocol (UDP) layer 516. A file system protocol layer provides multi-protocol data access and, to that end, includes support for the CIFS protocol 518, the Network File System (NFS) protocol 520 and the Hypertext Transfer Protocol (HTTP) protocol 522. In addition, the operating system 500 includes a disk storage layer 524 that implements a disk storage protocol, such as a Redundant Array of Independent Disks (RAID) protocol, and a disk driver layer 526 that implements a disk access protocol such as, e.g., a Small Computer Systems Interface (SCSI) protocol. Bridging the disk software layers with the network and file system protocol layers is a file system layer 530 of the storage operating system.

The file system layer 530 is responsive to file system protocols such as NFS, CIFS and HTTP, as well as disk storage layer protocols such as RAID protocols, and the file system layer 530 is additionally responsive to function calls from its designated libraries 540, such as fio library 542 and fio_metadir library 544. Therefore, the file system layer 530 can interface with other layers of the storage operating system using function calls contained in one of its recognized libraries 540. For instance, applications running in a system administration layer 550, e.g. a HTTP daemon or a Java Virtual Machine (JVM), can interface with the file system layer 530 using function calls contained in one of its recognized libraries. According to the present invention, at least one library of file access calls is recognized by file system layer 530 for user-accessible namespaces, such as the fio library 542, and at least one different library of file access calls is associated with "hidden" metadirectory namespaces, such as the fio_metadir library 544.

In one representative mode of operation, a request from a client 410 is forwarded as, e.g., a conventional CIFS protocol packet 450 over the computer network 440 and onto the filer 420 where it is received at the network adapter 426. A network driver of the media access layer 510 processes the packet, passes it onto the network protocol layers 512-514 and CIFS layer 518 for additional processing prior to forwarding to the file system layer 530. Here, the file system generates operations to load (retrieve) the requested data from disk 430 if it is not resident "incore", i.e., in memory 424. If the information is not in memory, the file system layer 530 determines a logical volume block number for the requested data. The file system layer then passes the logical volume block number to the disk storage (RAID) layer 524, which maps that logical number to a disk block number and sends the latter to an appropriate driver (e.g., SCSI) of the disk driver layer 526. The disk driver accesses the disk block number from disk 430 and loads the requested data in memory 424 for processing by the filer. Upon completion of the request, the filer (and operating system) returns a reply, e.g., a conventional acknowledgement packet defined by the CIFS specification, to the client 410 over the network 440.

It should be noted that the software "path" 560 through the operating system layers described above needed to perform data storage access for the client request received at the filer may alternatively be implemented in hardware. That is, in an alternate embodiment of the invention, the storage access request data path 560 may be implemented as logic circuitry embodied within a field programmable gate array (FPGA) or an application specific integrated circuit (ASIC). This type of hardware implementation increases the performance of the file service provided by filer 420 in response to a file system request packet 450 issued by client 410. Moreover, in another alternate embodiment of the invention, the processing elements of network and storage adapters 426, 428 may be configured to offload some or all of the packet processing and storage access operations, respectively, from processor 422 to thereby increase the performance of the file service provided by the filer.

C. Inode-Based File System

Figure 6:
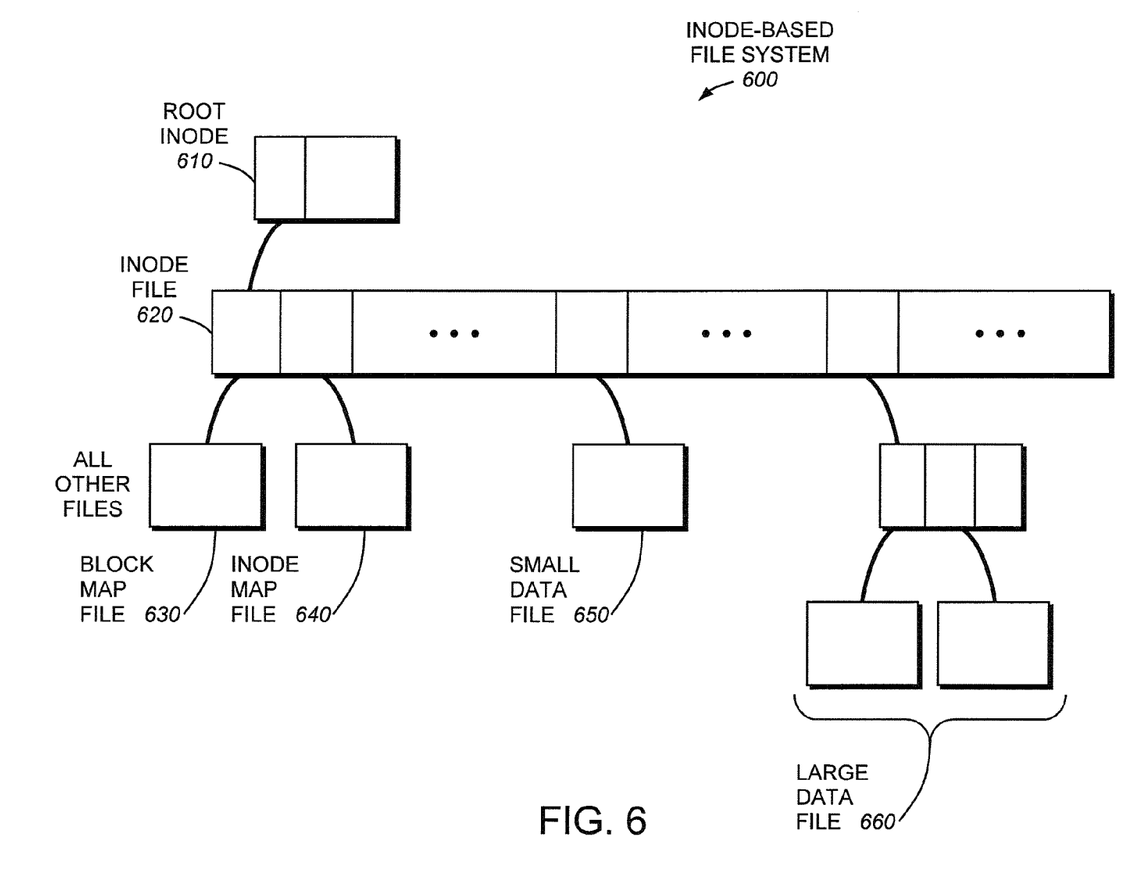
FIG. 6 is a schematic block diagram illustrating a hierarchical on-disk inode structure of a file system.

FIG. 6 illustrates an example of a file system that could be implemented by file system layer 530. More specifically, FIG. 6 shows the hierarchical structure of an inode-based file system 600, such as the Write Anywhere File Layout (WAFL™) file system implemented by the Data ONTAP™ storage operating system, available from Network Appliance, Inc. of Sunnyvale, Calif.

Broadly stated, a file system can be thought of as a tree of blocks that uses inodes to describe files. An inode is a data structure used to store information, such as metadata, about a file. An inode-based file system 600 comprises a hierarchical organization of inodes originating at a root inode 610, and the root inode describes an inode file 620. The inode file 620 contains the inodes that describe all other files and directories in the file system. For instance, one inode in inode file 620 may describe a block map file 630 that accounts for which storage blocks of disks 430 are in use. Similarly, another inode in the inode file 620 may describe an inode map file 640 indicating which inodes in the file system are in use. Other inodes in the inode file may describe small data files 650 that span a relatively small number of blocks on disk, and other inodes in the inode file may describe larger data files 660 that span a relatively large number of blocks on disk. Within the inode-based file system hierarchy are also, generally, indirect inodes that point to a plurality of inodes and indirect blocks that point to a plurality of data blocks. These have been omitted from the illustration for simplicity.

D. Metadirectory Namespace

Figure 7:
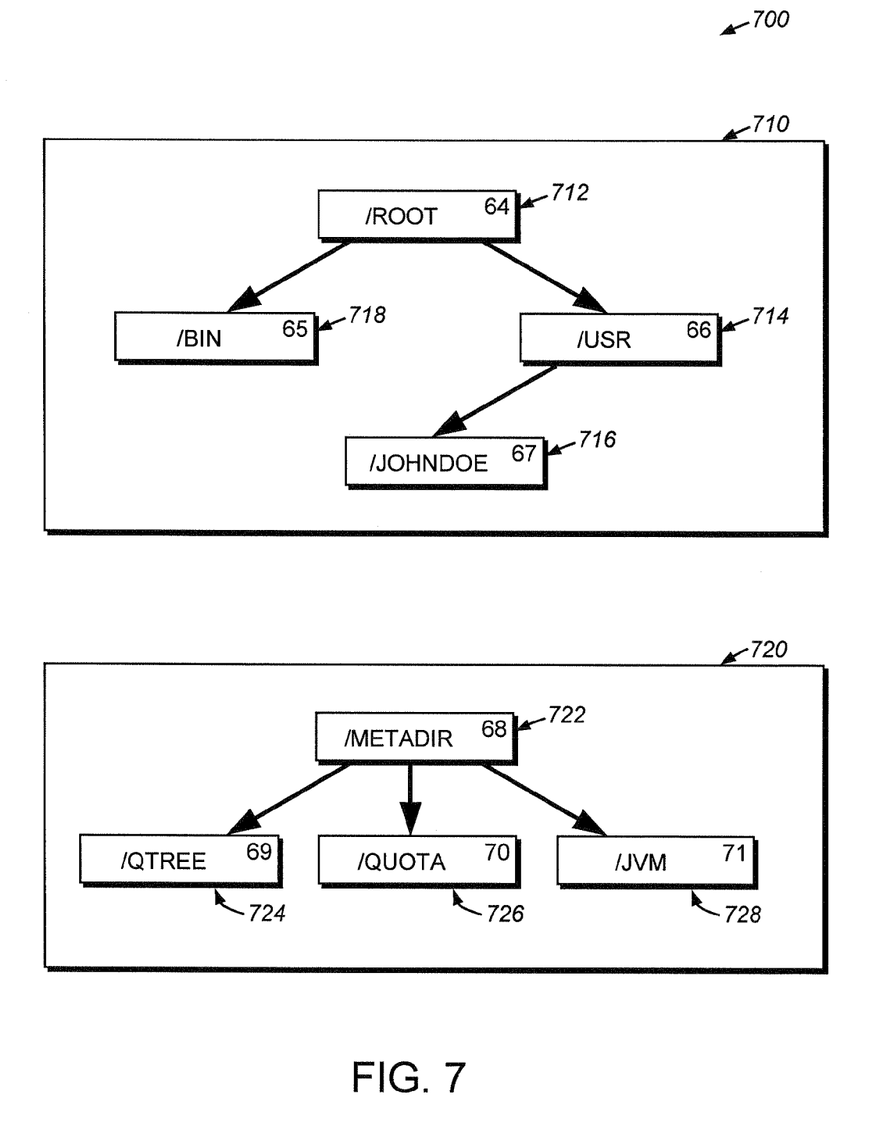
FIG. 7 is a schematic block diagram illustrating a user-accessible namespace and a separate metadirectory namespace.

FIG. 7 illustrates an embodiment of the present invention using inode-based file systems. The following discussion describes the present invention in terms of inode-based file systems, such as WAFL, solely for exemplary purposes, though the metadirectory namespace concepts of the present invention could be implemented by any storage operating system in the art.

A storage operating system 500 implements a file system 700 comprising both a user-accessible namespace 710 for storing user-accessible files and at least one "hidden" metadirectory namespace 720 for storing protected files that are not globally accessible. Such protected files may include, but are not limited to, system files, support files and configuration files used by the storage operating system. For instance, files in the metadirectory namespace 720 may include configuration files for a Java Virtual Machine (JVM) or a cache management utility, such as Netcache™ by Network Appliance, or may include configuration information for the user-accessible namespace 710, e.g., configuration for a Qtree corresponding to the user-accessible namespace. An example of Qtree metadata that may be stored in a metadirectory namespace is described in more detail in commonly assigned U.S. Pat. No. 7,043,485, entitled System and Method for Storage of Snapshot Metadata in a Remote File by Stephen L. Manley et al. which is expressly incorporated herein by reference.

When implemented in an inode-based file system, the user-accessible namespace 710 and the metadirectory namespace 720 organize data entities, such as files and directories, in separate hierarchical structures. That is, the user-accessible namespace and metadirectory namespace are associated with different root directory inodes 712 and 722, respectively. Further, a set of directory inodes 714-718 (ranging from inode number 64 to 67) correspond to the user-accessible data entities, whereas a different set of directory inodes 724-728 (ranging from inode number 68 to 71) correspond to the protected data entities in the metadirectory namespace that are not visible in the user-accessible namespace.

The storage operating system 500 of the present invention can check one or more flag bits associated with a requested file or directory to determine whether it resides in the user-accessible namespace 710 or the metadirectory namespace 720. Thus, when a client, user or application submits a file handle identifier comprising the inode number of a requested file or directory, the storage operating system uses flag bits associated with the requested inode to determine whether it is part of the metadirectory namespace 720. If the requested inode resides in the metadirectory namespace, the storage operating system then judges whether the requestor is permitted to access the requested inode.

Various techniques may be used to assess whether an originator of a request is permitted to access files and directories in the metadirectory namespace 720. For example, the storage operating system may keep a list of users, clients and applications allowed to access files in the metadirectory namespace, or the operating system may assume any requestor in possession of the special library of function calls 544 to the metadirectory namespace is an authorized user. Other known methods in the art could also be used to verify, authorize, or permit a requestor seeking file access to the metadirectory namespace.

An NVLOG (423 in FIG. 4) within a filer may be configured to store a series of ordered entries corresponding to discrete messages requesting file transactions, such as "WRITE," "CREATE," "OPEN," etc., for both the metadirectory namespace and the user-accessible namespace. A predetermined designation, such as a set flag bit, in an NVLOG entry may be used to distinguish a file access request for the metadirectory namespace from a request for the user-accessible namespace. Alternatively, each file system may be associated with a separate NVLOG located in one or more NVRAMs within the filer. Following a system crash or other instance in which the NVLOG information is required, entries are read from the NVLOG into the file system memory and replayed by the file system. The results of replaying file access requests stored in the NVLOG may then be committed to an appropriate disk storage, i.e. corresponding to a metadirectory or user-accessible namespace.

Figure 8:
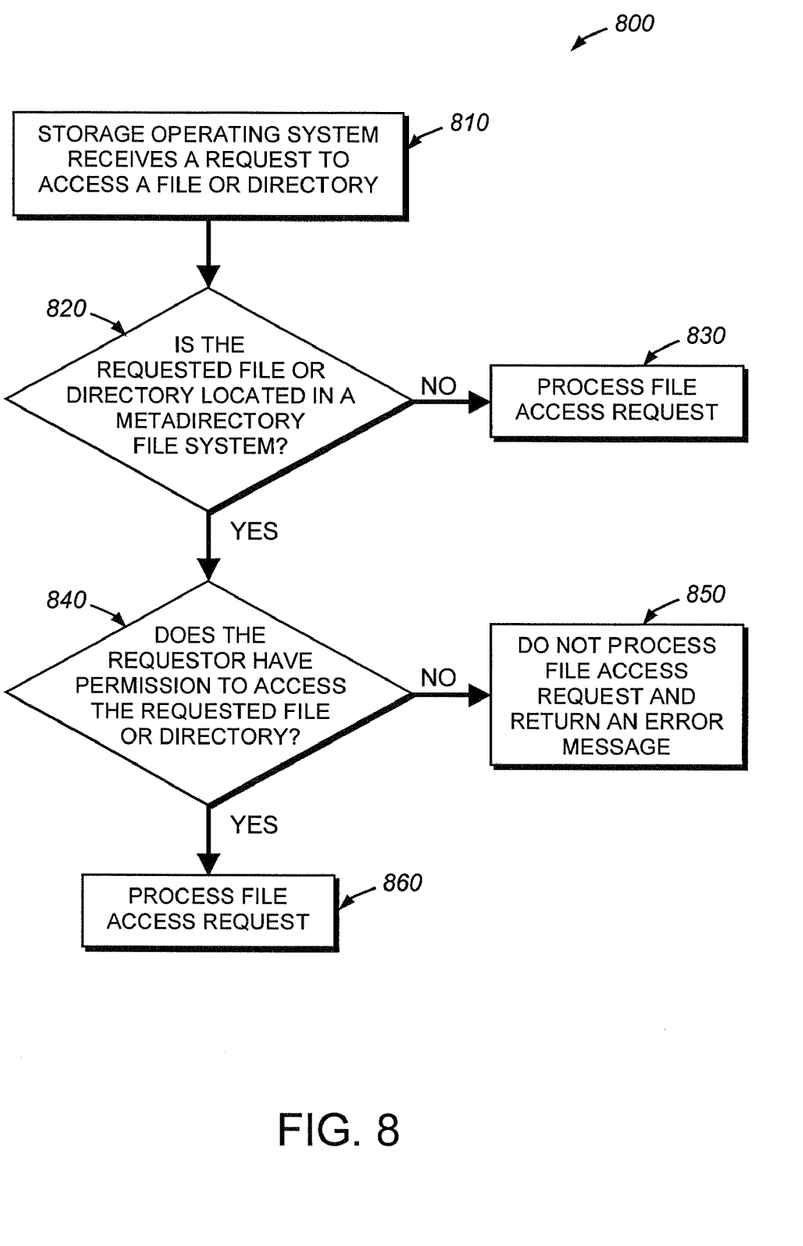
FIG. 8 is a flowchart illustrating an exemplary method for accessing a file or directory stored in a metadirectory namespace.

FIG. 8 is a flowchart illustrating an exemplary method 800 for accessing a file or directory stored in a metadirectory namespace of the present invention. At step 810, a storage operating system receives a request to access a file or directory. Next, at step 820, the storage operating system determines whether the requested file or directory is stored in a user-accessible namespace or in a separate metadirectory namespace. This determination may be based on where the file or directory is located, flags associated with the file or directory, or other methods for identifying membership of the requested file or directory to a metadirectory namespace.

At step 830, if the requested file or directory is stored in a user-accessible namespace, the file access request is processed normally. However, at step 840, when it is determined the file or directory is part of a metadirectory namespace, the storage operating system determines whether the requestor is permitted to access the metadirectory file or directory. Permission to access files and directories in a metadirectory namespace may depend on a number of criteria, such as comparing the requestor against a list of authorized requestors or assuming any requestor in possession of a special library of function calls is authorized to access metadirectory data.

At step 850, if the requestor does not have the requisite permissions to access the requested metadirectory file or directory, the file access request is not processed and an error message may be returned to the requestor. When the requestor is authorized to access the file or directory, the storage operating system processes the access request at step 860.

Figure 9:
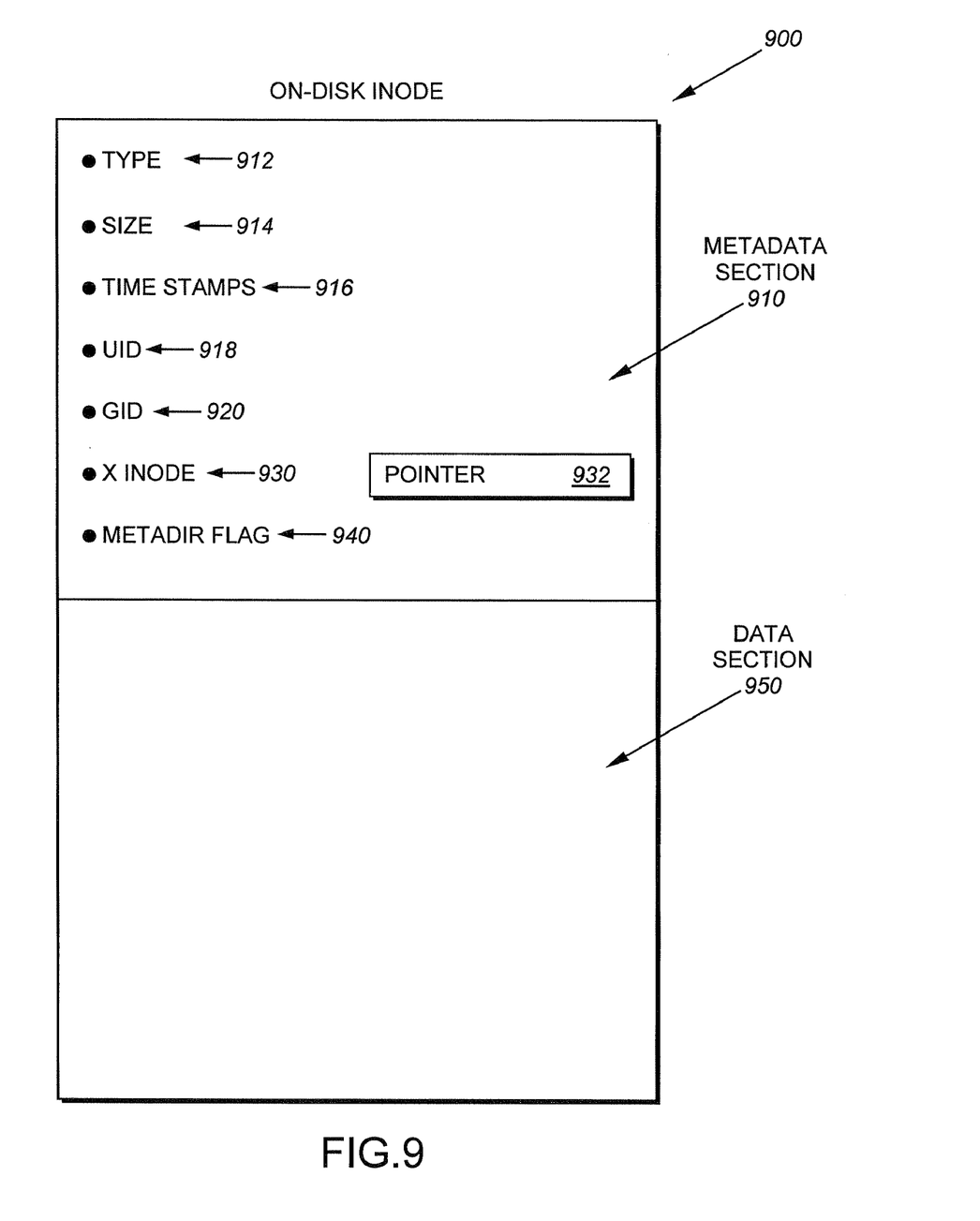
FIG. 9 is a schematic block diagram illustrating an on-disk inode data structure that may be advantageously used with the present invention.

FIG. 9 is a schematic block diagram illustrating an on-disk inode 900 for use in an inode-based file system, which preferably includes a metadata section 910 and a data section 950. The information stored in the metadata section 910 of each inode 900 describes the file and, as such, includes the type (e.g., regular or directory) 912 of file, the size 914 of the file, time stamps (e.g., access and/or modification) 916 for the file and ownership, i.e., user identifier (UID 918) and group ID (GID 920), of the file. The metadata section 910 further includes a xinode field 930 containing a pointer 932 that references another on-disk inode structure containing, e.g., access control list (ACL) information associated with the file or directory. Metadata section 910 can also include at least one flag bit (METADIR flag 940) to indicate whether the inode is stored in a special metadirectory namespace.

The contents of the data section 950 of inode 900 may be interpreted differently depending upon the type of file (inode) defined within the type field 912. For example, the data section 950 of a directory inode contains metadata controlled by the file system, whereas the data section of a regular inode contains user-defined data. In this latter case, the data section 950 includes a representation of the data associated with the file.

The foregoing has been a detailed description of an illustrative embodiment of the invention. Various modifications and additions can be made without departing from the spirit and scope of the invention. For example, it is understood metadirectory namespaces can be used with non-inode based file systems so long as the metadirectory namespace is not visible from one or more coexistent user-accessible namespaces. Additionally, while this description has been written in reference to filers and file servers, the principles are equally pertinent to all types of computers, including stand alone computers. Further, it is expressly contemplated that the teachings of this invention can be implemented as software, including a computer-readable medium having program instructions executing on a computer, hardware, firmware, or a combination thereof. Accordingly this description is meant to be taken only by way of example and not to otherwise limit the scope of the invention.

What is claimed is:

1. A method for operating a data storage system, comprising:

maintaining a user-accessible namespace to hold user-accessible files, the user-accessible namespace having a first set of inodes pointing to the user-accessible files;

maintaining a metadirectory namespace, the metadirectory namespace to hold names of protected files, the metadirectory namespace having a second set of inodes pointing to the protected files;

maintaining a flag in the first set of inodes and the second set of inodes, and indicating by the flag in a selected inode having a first value that the selected inode points to the user-accessible files and indicating by the flag having a second value that the selected inode points to the protected files;

receiving from a requesting client a data access request for a requested file;

checking the flag in an inode pointing to the requested file;

when the flag in the inode pointing to the requested file has the first value, permitting the data access request to the requested file; and when the flag in the inode pointing to the requested file has the second value, checking an access control list, and if the requesting client is permitted by the access control list to access the requested file permitting the data access request to the requested file, and if the requesting client is not permitted by the access control list to access the requested file denying the data access request to the requested file.

2. A method for operating a data storage system, comprising:

maintaining a flag in metadata of an inode pointing to a file;

indicating by the flag having a first value that the file is a user-accessible file, and indicating by the flag having a second value that the file is a protected file;

upon receiving a data access request from a requesting client for a requested file, checking the flag in an inode pointing to the requested file;

when the flag in the inode pointing to the requested file has the first value, permitting the data access request to the requested file; and when the flag in the inode pointing to the requested file has the second value, checking an access control list, and if the requesting client is permitted by the access control list to access the requested file permitting the data access request to the requested file, and if the requesting client is not permitted by the access control list to access the requested file denying the data access request to the requested file.

3. A data storage system apparatus, comprising:

a user-accessible namespace to hold user accessible files, the user-accessible namespace having a first set of inodes pointing to the user-accessible files;

a metadirectory namespace, the metadirectory namespace to hold names of protected files, the metadirectory namespace having a second set of inodes pointing to the protected files;

a flag maintained in the first set of inodes and the second set of inodes, and indicating by the flag in a selected inode having a first value that the selected inode points to the user-accessible files and indicating by the flag having a second value that the selected inode points to the protected files;

a network adapter to receive from a requesting client a data access request for a requested file;

a process to check the flag in the selected inode pointing to the requested file;

when the flag in the selected inode pointing to the requested file has the first value, the process to permit the data access request to the requested file; and when the flag in the selected inode pointing to the requested file has the first value, permitting the data access request to the requested file; and when the flag in the inode pointing to the requested file has the second value, checking an access control list, and if the requesting client is permitted by the access control list to access the requested file permitting the data access request to the requested file, and if the requesting client is not permitted by the access control list to access the requested file denying the data access request to the requested file.

4. A data storage system apparatus, comprising:

a flag maintained in metadata of an inode pointing to a file of data;

the flag indicating by having a first value whether the file is a user-accessible file, and indicating by the flag having a second value whether the file is a protected file;

a network adapter to receive a data access request from a requesting client for a requested data block of the file, the flag in the inode pointing to the requested data block;

when the flag in the inode pointing to the requested data block has the first value, the data storage system to permit the data access request to the requested data block; and when the flag in the inode pointing to the requested data block has the second value, the data storage system to check an access control list, and if the requesting client is permitted by the access control list to access the requested data block, the data storage system to permit the data access request to the requested data block, and if the requesting client is not permitted by the access control list to access the requested file, the data storage system to deny the data access request to the requested data block.

5. A non-volatile computer readable storage media, comprising:

said computer readable storage media containing program instructions for execution on a processor for a method of operating a data storage system, the program instructions for, maintaining a flag in metadata of an inode pointing to a file;

indicating by the flag having a first value that the file is a user accessible file, and indicating by the flag having a second value that the file is a protected file;

upon receiving a data access request from a requesting client for a requested file, checking the flag in the inode pointing to the requested file;

when the flag in the inode pointing to the requested file has the first value, permitting the data access request to the requested file; and when the flag in the inode pointing to the requested file has the second value, checking an access control list, and if the requesting client is permitted by the access control list to access the requested file permitting the data access request, and if the requesting client is not permitted by the access control list to access the requested file denying the data access request to the requested file.

6. A method for operating a data storage system, comprising:

maintaining a user-accessible namespace to hold user-accessible files;

maintaining a metadirectory namespace to hold protected files;

maintaining a flag in metadata pointing to a selected file;

indicating by the flag having a first value that the selected file is stored in the user-accessible namespace and is a user accessible selected file, and indicating by the flag having a second value that the selected file is stored in the metadirectory namespace and is a protected selected file;

configuring the data storage system to receive from a requesting client a data access request for a requested file;

configuring the data storage system to check the flag pointing to the requested file;

when the flag in the metadata pointing to the requested file has the first value, configuring the data storage system to permit the data access request to the requested file; and when the flag in the metadata pointing to the requested file has the second value, configuring the data storage system to check an access control list, and if the requesting client is permitted by the access control list to access the requested file configuring the data storage system to permit the data access request to the requested file, and if the requesting client is not permitted by the access control list to access the requested file configuring the data storage system to deny the data access request to the rquested file.

7. A data storage system apparatus, comprising:
a user-accessible namespace to hold user-accessible files;
a metadirectory namespace to hold protected files;
a flag in metadata pointing to a selected file;
a process to indicate by the flag having a first value that the selected file is stored in the user accessible namespace, and to indicate by the flag having a second value that the selected file is stored in the metadirectory namespace;
the data storage system configured to receive from a requesting client a data access request for the selected file;
the data storage system configured to check the flag in metadata pointing to the selected file;
when the flag in the metadata pointing to the selected file has the first value, the data storage system to permit the data access request to the selected file; and
when the flag in the metadata pointing to the selected file has the second value, the data storage system to check an access control list, and if the requesting client is permitted by the access control list to access the selected file the data storage system to permit the data access request to the selected file, and if the requesting client is not permitted by the access control list to access the selected file the data storage system to deny the data access request to the selected file.

8. A non-volatile computer readable storage media, comprising:
said computer readable storage media containing program instructions for execution on a processor for a method of operating a data storage system, the program instructions for,
maintaining a user-accessible namespace to hold user-accessible files;
maintaining a metadirectory namespace, the metadirectory namespace to hold protected files;
maintaining a flag in metadata pointing to a selected file;
indicating by the flag having a first value that the selected file is stored in the user-accessible namespace and is a user-accessible selected file, and indicating by the flag having a second value that the selected file is stored in the metadirectory namespace and is a protected selected file;
configuring the data storage system to receive from a requesting client a data access request for the selected file;
configuring the data storage system to check the flag pointing to the selected file;
when the flag in the metadata pointing to the selected file has the first value, configuring the data storage system to permit the data access request to the selected file; and
when the flag in the metadata pointing to the selected file has the second value, configuring the data storage system to check an access control list, and if the requesting client is permitted by the access control list to access the selected file configuring the data storage system to permit the data access request to the selected file, and if the requesting client is not permitted by the access control list to access the selected file configuring the data storage system to deny the data access request to the selected file.

9. The method of claim 1, further comprising:
maintaining a NVLOG of data access requests to enable replaying of the NVLOG in the event that the data storage system crashes.

10. The method of claim 1, further comprising:
executing at least one process on a processor of the data storage system to execute the checking of the flag in the inode pointing to the requested file.

11. The method of claim 1, further comprising:
maintaining more than one user-accessible namespace.

12. The method of claim 1, further comprising:
maintaining more than one metadirectory namespace.

13. The method of claim 1, further comprising:
maintaining separate root directory inodes for the user-accessible namespace and the metadirectory namespace.

14. The method of claim 1, further comprising:
maintaining separate directories for the user-accessible namespace and the metadirectory namespace.

15. The method of claim 1, further comprising:
maintaining separate files for the user-accessible namespace and the metadirectory namespace.

16. The method as in claim 2, further comprising:
maintaining one or more user-accessible namespaces.

17. The method as in claim 2, further comprising:
maintaining a metadirectory namespace, the metadirectory namespace to hold names of protected files.

18. The method as in claim 17, further comprising:
exporting the metadirectory namespace to authorized clients, the authorized clients authorized to access the protected files.

19. The method of claim 2, further comprising:
maintaining a NVLOG of data access requests to enable replaying of the NVLOG in the event that the data storage system crashes.

20. The method of claim 2, further comprising:
executing at least one process on a processor of the data storage system to execute the checking of the flag in the inode pointing to the requested file.

21. The method of claim 2, further comprising:
maintaining more than one user-accessible namespace.

22. The method of claim 2, further comprising:
maintaining more than one protected metadirectory namespace.

23. The method of claim 2, further comprising:
maintaining separate root directory inodes for a user-accessible namespace and a protected metadirectory namespace.

24. The method of claim 2, further comprising:
maintaining separate directories for a user-accessible namespace and a protected metadirectory namespace.

25. The method of claim 2, further comprising:
maintaining separate files for a user-accessible namespace and a protected metadirectory namespace.

26. The apparatus of claim 3, further comprising:
a NVLOG of data access requests maintained to enable replaying of the NVLOG in the event that the data storage system crashes.

27. The apparatus of claim 3, further comprising:
more than one user-accessible namespace maintained by the data storage system.

28. The apparatus of claim 3, further comprising:
more than one metadirectory namespace maintained by the data storage system.

29. The apparatus of claim 3, further comprising:
separate root directory inodes maintained for the user-accessible namespace and maintained for the metadirectory namespace.

30. The apparatus of claim 3, further comprising:
separate directories maintained for the user-accessible namespace and maintained for the metadirectory namespace.

31. The apparatus of claim 3, further comprising:
separate files maintained for the user-accessible namespace and maintained for the metadirectory namespace.

32. The apparatus as in claim 4, further comprising:
one or more user-accessible namespaces, the one or more user-accessible namespaces to have a first set of inodes.

33. The apparatus as in claim 4, further comprising:
a metadirectory namespace, the metadirectory namespace to hold names of protected files.

34. The apparatus as in claim 33, further comprising:
a process to export the metadirectory namespace to authorized clients, the authorized clients authorized to access the protected files.

35. The apparatus of claim 4, further comprising:
a NVLOG of data access requests maintained to enable replaying of the NVLOG in the event that the data storage system crashes.

36. The apparatus of claim 4, further comprising:
at least one process on a processor of the data storage system to check the flag in the inode pointing to the requested data block.

37. The apparatus of claim 4, further comprising:
more than one user-accessible namespace maintained by the data storage system.

38. The apparatus of claim 4, further comprising:
more than one metadirectory namespace maintained by the data storage system.

39. The apparatus of claim 4, further comprising:
separate root directory inodes maintained for a user-accessible namespace and maintained for a metadirectory namespace.

40. The apparatus of claim 4, further comprising:
separate directories maintained for a user-accessible namespace and maintained for a metadirectory namespace.

41. The apparatus of claim 4, further comprising:
separate files maintained for a user-accessible namespace and maintained for a metadirectory namespace.

42. The method as in claim 6, further comprising:
configuring the data storage system to export the metadirectory namespace to authorized clients, the authorized clients authorized to access the protected files.

43. The method as in claim 6, further comprising:
configuring the data storage system to use a bit as the flag.

44. The method as in claim 6, further comprising:
configuring the data storage system to have a first set of inodes for the user-accessible namespace, and configuring the metadirectory namespace to have a second set of inodes for the protected files.

45. The apparatus as in claim 7, further comprising:
the data storage system configured to export the metadirectory namespace to authorized clients, the authorized clients authorized to access the protected files.

46. The apparatus as in claim 7, further comprising:
the data storage system configured to use a bit as the flag.

47. The apparatus as in claim 7, further comprising:
the data storage system configured to have a first set of inodes for the user-accessible namespace, and configured to have a second set of inodes for the metadirectory namespace.

48. The method as in claim 1, further comprising:
using a bit as the flag.

49. The system as in claim 3, further comprising:
a bit used as the flag.

\* \* \* \* \*

UNITED STATES PATENT AND TRADEMARK OFFICE
CERTIFICATE OF CORRECTION

| | | |
|---|---|---|
| PATENT NO. | : 7,979,416 B1 | Page 1 of 1 |
| APPLICATION NO. | : 12/564295 | |
| DATED | : July 12, 2011 | |
| INVENTOR(S) | : Douglas J. Santry et al. | |

It is certified that error appears in the above-identified patent and that said Letters Patent is hereby corrected as shown below:

In the Specification:

Col. 6, line 53 should read:
only from a remote client 410, but also from a local user 460

Signed and Sealed this
Twelfth Day of January, 2016

Michelle K. Lee
*Director of the United States Patent and Trademark Office*